Nov. 4, 1941.  A. E. WALSH  2,261,749
TAIL SKINNER
Filed March 21, 1941
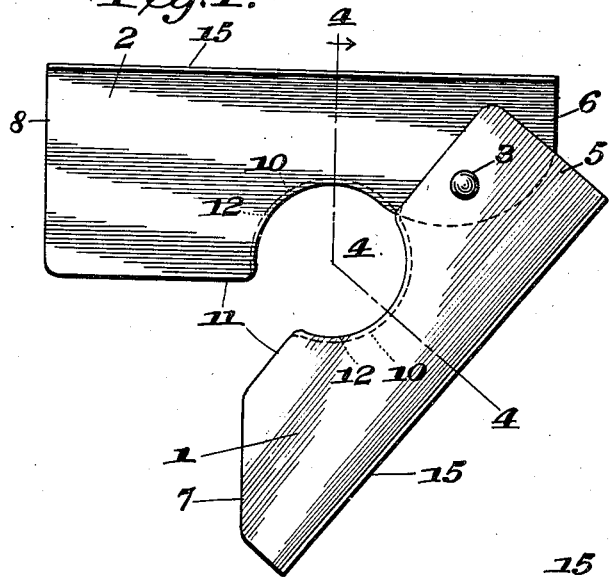
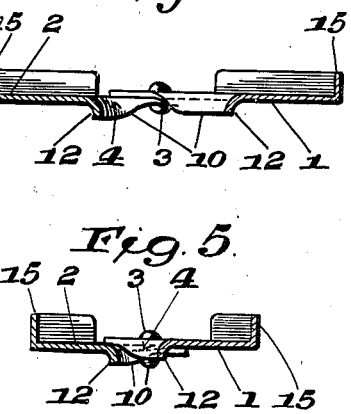
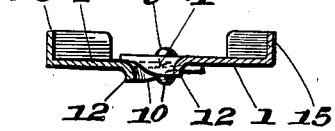
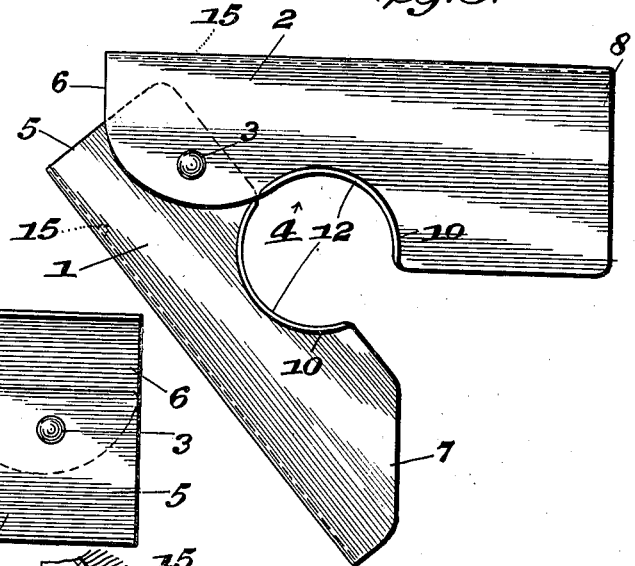
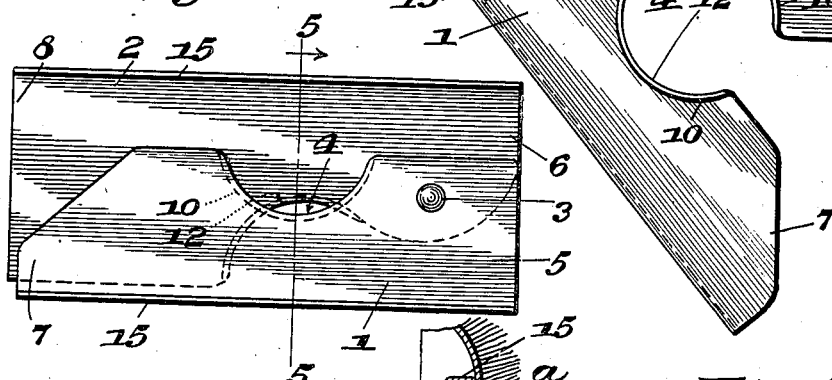
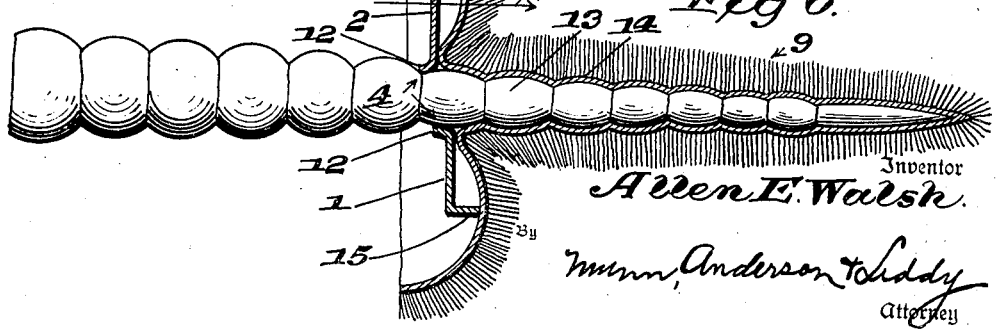
Inventor
Allen E. Walsh.
Munn, Anderson & Liddy
Attorney Patented Nov. 4, 1941

2,261,749

UNITED STATES PATENT OFFICE 2,261,749

TAIL SKINNER

Allen E. Walsh, Fallon, Nev.

Application March 21, 1941, Serial No. 384,535

3 Claims. (Cl. 17—21)

This invention relates to improvements in contrivances for handling furs, that is to say, in the procedure of removing a fur from a carcass. More specifically, the purpose of the invention is to remove the skin from the tail bone of a fur bearing animal.

This particular step in the removal of a skin is often the cause of the main trouble encountered by the workman, especially if he should happen to be an amateur trapper. With such, the removal of the skin from the tail bone presents the main difficulty which in some instances is unsatisfactorily overcome by cutting the bone off and selling it with the pelt, and in other instances by tearing the tail skin off of the pelt. In other cases the difficulty is sought to be avoided by splitting the skin along the tail bone, but inasmuch as the knife is apt to take a spiral course along the tail bone the skin takes an objectionable twist. These difficulties are definitely avoided by the use of the instant implement, the objects of which are as follows:

First, to provide a tail skinner which renders easy the specific operation of stripping the skin from the tail bone of a fur bearing animal.

Second, to provide a tail skinner which avoids the mutilation of the skin so that it can be stripped from the tail bone intact.

Third, to provide a tail skinner which is automatically adaptable to the diminishing size of the tail bone toward its tip.

Fourth, to provide a tail skinner which will easily and efficiently strip the skin from the tail bone of any fur-bearing animal (excluding fur-bearing animals that have no fur on their tails) from a wolf to a weasel.

Other objects and advantages will appear in the following specification, in which:

Figure 1 is an elevation of the improved tail skinner showing the jaws open and illustrating its appearance when viewed from the side intended to be farthest from the animal.

Figure 2 is a similar view showing the jaws closed.

Figure 3 is a view similar to Fig. 1 illustrating the appearance of the device when seen from the side next to the body of the animal.

Figure 4 is a cross section taken on the line 4—4 of Fig. 1.

Figure 5 is a cross section taken on the line 5—5 of Fig. 2.

Figure 6 is a combined sectional and elevational view illustrating the mode of use of the implement.

In carrying out the invention the tail skinner is made to consist of a narrow jaw 1 and a broad jaw 2. These jaws are hinged or pivoted together at 3, use being made of a rivet but any satisfactory substitute being useful in its stead.

The pivot 3 occurs at one side of what is here identified as an opening 4. The pivot or heel ends 5, 6, of the respective jaws may be shaped in any convenient way, but in practice it is desirable to substantially square the heels of the jaw 1 and to round the heel 6 of the jaw 2. The opposite and free ends 7, 8, are desirably beveled and squared off, also as shown, chiefly for the purpose of readily distinguishing one jaw from the other. The two jaws are naturally overlapped, and in applying the implement the jaws 1 and 2 are intended to be emplaced on the tail 9 of the animal as shown in Fig. 6.

Depressed places 10 on the inner margins 11 of the two jaws define the nucleus of the previously mentioned opening 4. The depressions 10 are oblong in shape, and their edges 12 are bent over (Figs. 4, 5 and 6) to ride the bones 13 of the tail in the act of stripping off the skin 14. Since the jaw 1 goes next to the animal it follows that the edges 12 are directed back toward the animal. Said edges are thus prevented from catching in the joints of the tail bone 13.

The outermost longitudinal edges of the two jaws are flanged at 15. This flanging is primarily to avoid cutting the hands of the operator when he squeezes the jaws together in the act of stripping. An incidental purpose, however, is that of strengthening the jaws in the longitudinal direction so that they will not flex. The pivot 3 is set with some degree of tightness, but actually the hinging of the jaws is rather loose. This comes out of the necessity of the inner face of the jaw 1 to ride over the protruding bent edge 12 of the jaw 2 in closing the device to the position shown in Fig. 2.

The operation is readily understood. The first act of the trapper in removing a fur is to skin the hind legs and partly down the body until the tail skin stops him. He then splits the tail skin one inch on the underside of the tail, cuts the ligaments that hold the skin around the tail, and then pulls the skin off one inch. This makes room for the displacement of the tail skinner on the tail bone. The broad jaw 2 goes on top while the narrow jaw 1 goes underneath.

One of the operators's hands is then braced against the animal while the tail skinner is grasped in the other hand. A pulling motion (arrow a) strips the skin 14 off, and the diminishing size of the tail bone is compensated for by the closure of the device under hand pressure. This pressure persists all the way out to the tip. The opening 4 eventually becomes quite small (Fig. 2) because the overlapped relationship of the jaws 1, 2, allow them to pass each other under continuous closing pressure. Since the bends 12 extend oppositely to the direction of pull (arrow $a$) it follows that the edges of the opening 4 cannot catch in the joints of the bones 13 in the tail 9.

I claim:

1. A tail skinner comprising a pair of jaws having contiguously located depressed places to define the nucleus of an opening to receive an animal tail, and means connecting the jaws for the registration of the depressed places, the connection of the jaws being in overlapping relationship for the relative movement of the jaws into the progressively diminishing size of said opening as the skinner is drawn toward the tip of said tail.

2. A tail skinner comprising a pair of overlapped and movably connected jaws adapted to closure toward each other upon an animal tail by manual pressure when held in the hand of an operator, and depressed places on adjacent margins of the jaws constituting the nucleus of an opening for said tail and encroaching upon each other for a progressive diminution in the size of said opening during said closure.

3. A tail skinner comprising a pair of jaws, a pivot movably connecting the jaws at one end so as to allow swinging of the jaws toward and away from each other, each of the jaws embodying distinguishing shapes to insure a preferred emplacement of the skinner on a tail bone, and depressed places in the confronting edges of the jaws, defining the nucleus of an opening for the occupancy of the tail bone, the rims of said places being curled back in a common direction to avoid catching the bone joints when the preferred emplacement is adopted.

ALLEN E. WALSH.